US008381226B2

(12) United States Patent
Kahlon et al.

(10) Patent No.: US 8,381,226 B2
(45) Date of Patent: Feb. 19, 2013

(54) SYSTEM AND METHOD FOR MONOTONIC PARTIAL ORDER REDUCTION

(75) Inventors: Vineet Kahlon, Princeton, NJ (US); Chao Wang, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1050 days.

(21) Appl. No.: 12/367,140

(22) Filed: Feb. 6, 2009

(65) Prior Publication Data

US 2009/0204968 A1     Aug. 13, 2009

Related U.S. Application Data

(60) Provisional application No. 61/026,832, filed on Feb. 7, 2008.

(51) Int. Cl.
*G06F 11/36* (2006.01)
(52) U.S. Cl. ........................................ 718/106; 717/131
(58) Field of Classification Search .................. None
See application file for complete search history.

(56) References Cited

U.S. PATENT DOCUMENTS

| 6,779,135 B1 * | 8/2004 | Ur et al. ..................... 714/38.13 |
| 7,287,255 B2 * | 10/2007 | Potter, Jr. ....................... 718/102 |
| 2006/0248515 A1 * | 11/2006 | Qadeer et al. ................. 717/127 |

OTHER PUBLICATIONS

Delzanno, Giorgio, etal., Towards the Automated Verification of Multithreaded Java Programs, 2002, Springer-Verlag, pp. 173-187.*
Cook, Byron, etal., Symbolic Model Checking for Asynchronous Boolean Programs, 2005,Springer-Verlag, pp. 75-90.*
Valmari, Antti, Eliminating Redundant Interleavings during Concurrent Program Verification, 1989, PARLE '89,pp. 89-103.*
Jayaraman, Bharat etal., Partial Order Programming, 1995, Singerlink, Algebraic Methodology and Software Technology, vol. 936, pp. 561-575.*
Basin, David etal., Constraint Differentiation: A New Reduction Technique for Constraint-Based Analysis of Security Protocols, 2003, ACM, CCS'03 pp. 335-344.*
Yan, Yuhong, etal., Monotone Pieces Analysis for Qualitative Modeling, 2004, MONET Workshop on Model Based System, 6 pages.*
Ehrenfeucht, A. etal., Quasi-monotonic sequences: theory, algorithms and applications, 1984, Dept of Computer Science University of Colorado, 33 pages.*
Esparaza, Javier etal., Unfoldings a Partial-Order Approach to Model Checking, Jan. 12, 2008, Springer, 179 pages.*
Amadio, Roberto, etal., Feasible Reactivity for Synchronous Cooperative Threads, 2006, Elsevier B.V. , pp. 33-42.*
Ball, Thomas etal., Optimally Profiling and Tracing Programs, Sep. 1991, Computer Sciences Dept. Univ. of Wisconsin, 31 pages.*
Agrawal, Sitij, etal., Optimizing Stream Programs Using Linear State Space Analysis, Sep. 2005, ACM, 11 pages.*

* cited by examiner

*Primary Examiner* — Eric Coleman
(74) *Attorney, Agent, or Firm* — Joseph Kolodka; James Bitetto (57) ABSTRACT

A system and method for analyzing concurrent programs that guarantees optimality in the number of thread inter-leavings to be explored. Optimality is ensured by globally constraining the inter-leavings of the local operations of its threads so that only quasi-monotonic sequences of threads operations are explored. For efficiency, a SAT/SMT solver is used to explore the quasi-monotonic computations of the given concurrent program. Constraints are added dynamically during exploration of the concurrent program via a SAT/SMT solver to ensure quasi-montonicity for model checking.

6 Claims, 5 Drawing Sheets

$T_1$ () {
$\quad c_1$ : sh = 1;
}

$T_2$ () {
$\quad c_2$ : sh = sh';
}

$T_3$ () {
$\quad c_3$ : sh' = 2;
}

SYSTEM AND METHOD FOR MONOTONIC PARTIAL ORDER REDUCTION

RELATED APPLICATION INFORMATION

This application claims priority to provisional application Ser. No. 61/026,832 filed on Feb. 7, 2008, incorporated herein by reference.

BACKGROUND

1. Technical Field

The present invention relates to computer program analysis and more particularly to a system and method for monotonic partial order reduction in evaluation of concurrent programs.

2. Description of the Related Art

In concurrent systems, like device drivers, the number of interleavings of transitions from different threads or processes can be very large. This results in large state spaces and makes verification difficult for concurrent programs. Existing partial order reduction methods for pruning redundant interleavings during verification are either non-optimal, not accurate enough or not suited for symbolic implementation.

Existing partial order reduction methods for pruning redundant interleaving during verification are based either on computing persistent sets by using static analysis to compute the set of dependencies. Since static analysis typically over-approximates the set of behaviors of the given program, it may over-estimate the set of dependencies between transitions—making these techniques non-optimal. Moreover, these methods are not easy to incorporate in a symbolic model checking framework.

In explicit-state model checking, partial order reduction (POR) techniques have been developed to exploit the equivalence of interleavings of independent transitions in order to reduce the search state space. Since computing the precise dependence relation may be as hard as verification itself, existing POR methods often use a conservative static analysis to compute an approximation for it. Dynamic and Cartesian partial order reduction obviate the need for applying static analysis a priori by detecting collisions (data dependencies) on-the-fly. These methods can, in general, achieve more reduction due to the more accurate collision detection. However, applying these POR methods (which were designed for explicit-state algorithms) to symbolic model checking is a non-trivial task.

A major strength of SAT-based (satisfiability-based) symbolic methods is that property dependent and data dependent search space reduction is automatically exploited inside modern SAT or SMT (Satisfiability Modulo Theory) solvers, through the addition of conflict clauses and non-chronological backtracking. Symbolic methods are often more efficient in reasoning about variables with large domains. However, combining classic POR methods (e.g., those based on persistent-sets) with symbolic algorithms has proven to be difficult. The difficulty arises from the fact that symbolic methods implicitly manipulate large sets of states as opposed to manipulating states individually. Capturing and exploiting transitions that are dynamically independent with respect to a set of states is much harder than for individual states.

Figure 1:
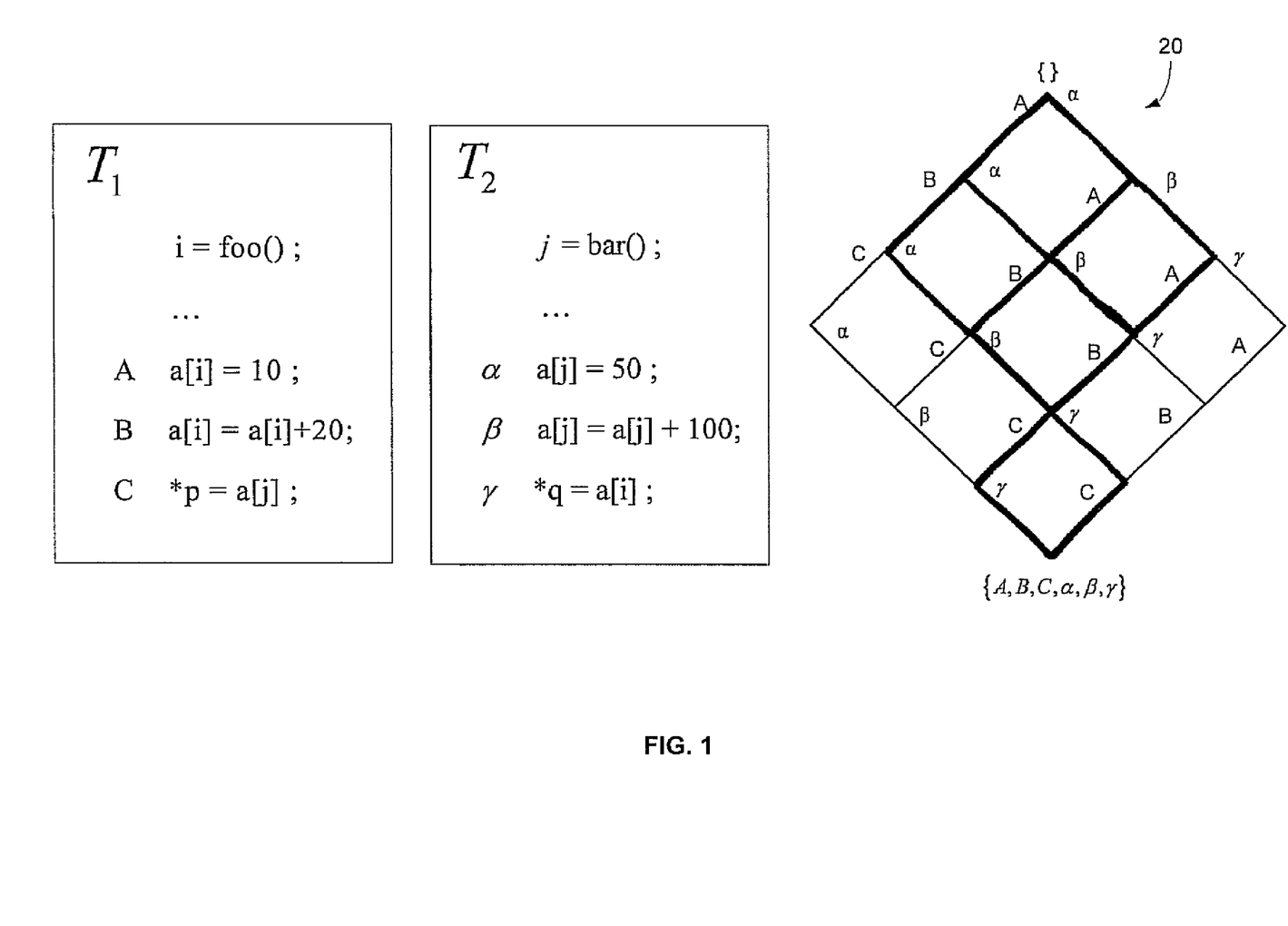
FIG. 1 shows program code for two threads where transitions $t_A, t_B$ are independent from $t_\alpha, t_\beta$ when $i \neq j$; $t_C$ is independent from $t_\gamma$ when $(i \neq j) \wedge (p \neq q)$ and a lattice of interleavings is also depicted.

Consider the example program shown in FIG. 1 comprised of two concurrent threads accessing a global array $a[\ ]$ and an interleaving lattice 20. The two pointers p and q may be aliased. Statically, transitions $t_A$, $t_B$ in thread $T_1$ are dependent with tar $t_\alpha$, $t_\beta$ in $T_2$. Therefore, POR methods relying on a static analysis may be ineffective. Note that when $i \neq j$ holds in some executions, $t_A, t_B$ and $t_\alpha, t_\beta$ become independent, meaning that the two sequences $t_A; t_B; t_\alpha; t_\beta; t_C; t_\gamma;$ and $t_\alpha; t_\beta; t_A; t_B; t_C; t_\gamma;$ are equivalent. However, none of the existing symbolic partial order reduction methods takes advantage of such information.

Among explicit-state POR methods, dynamic partial order reduction and Cartesian partial order reduction are able to achieve some reduction by detecting conflicts on-the-fly. In any individual state s, the values of i and j (as well as p and q) are fully determined, making it much easier to detect conflicts. However, it is not clear how to directly apply these techniques to symbolic model checking, where conflict detection is performed with respect to a set of states. Missing out on these kind of partial-order reductions can be costly, since a symbolic model checker needs to exhaustively search among the reduced set of execution sequences. The number of valid interleavings (sequences) can be large even for moderate sized programs.

Recently, a new technique called Peephole Partial Order Reduction (PPOR) has been proposed that allows partial order reduction to be integrated with symbolic state space exploration techniques. The key idea behind PPOR is to place constraints on which processes can be scheduled to execute in the next two steps starting at each global state. If in a global state, transitions tr and tr' such that tid(tr)<tid(tr'), where tid denotes thread-id, are enabled and independent then tr' cannot execute immediately before tr. It was shown that PPOR is optimal for programs with two threads but non-optimal for programs with more than two. The reason is that to achieve optimality for programs with more than two threads, we might need to track dependency chains involving many processes. These chains, which could be spread out over an entire computation, are hard to capture via local scheduling constraints.

SUMMARY

A new technique called Monotonic Partial Order Reduction (MPOR) effectively combines dynamic partial order reduction with symbolic state space exploration methods for model checking concurrent software. The present principles hinge on a new characterization of partial orders of concurrent programs in terms of quasi-monotonic sequences of threads-ids. This characterization, which is of independent interest, can be used both for explicit or symbolic model checking. For symbolic model checking, MPOR works by adding constraints to allow automatic pruning of redundant interleavings in an SMT/SAT solver based search by restricting the interleavings explored to the set of quasi-monotonic sequences. Quasi-monotonicity guarantees both soundness (all necessary interleavings are explored) and optimality (no redundant interleavings are explored). A technique called Peephole POR has recently been proposed for symbolic dynamic POR. However PPOR is guaranteed to be optimal only for programs with two threads. MPOR, on the other hand, is guaranteed optimal for an arbitrary number of threads and is, to the best of our knowledge, the only known optimal symbolic POR technique.

To summarize the present principles provide at least: (1) the notion of quasi-monotonic sequences, which allows us to define a unique representative from each partial order on the computation of the given program; (2) a monotonic partial order reduction that adds constraints to ensure quasi-monotonicity, along with a symbolic formulation; and (3) the guarantee of removing all redundant interleavings for systems with an arbitrary number of threads. This kind of reduction has not been achieved by previous symbolic methods.

A system and method for analyzing a program includes inputting a concurrent program having two or more threads with an interleaving therebetween. Transitions in the threads are globally constrained. Only quasi-monotonic sequences are explored in the threads. The program is model checked to determine satisfiability of states within the threads. The program is updated in accordance with a determination of non-satisfiability.

A method for analyzing concurrent programs includes globally constraining inter-leavings of local operations of threads in a concurrent program and exploring only quasi-monotonic sequences of thread operations that guarantee optimality in a number of thread inter-leavings to be explored to limit analysis of the concurrent program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a new system/method called Monotonic Partial Order Reduction (MPOR) exploits a new characterization of partial orders of a program in terms of quasi-monotonic sequences of threads-ids. This characterization, which is of independent interest, can be used both for explicit or symbolic model checking. The basic observation exploited by various POR methods is that different execution sequences may correspond to the same equivalence class. According to Mazurkiewicz' trace theory, which is known in the art, two sequences are equivalent if they can be obtained from each other by successively permuting adjacent independent transitions. We show that restricting the set of interleavings explored to the quasi-monotonic sequence guarantees both soundness (all necessary interleavings are explored) and optimality (no redundant interleavings are explored). This is accomplished by proving that for each computation there exists a quasi-monotonic sequence that is Mazurkiewicz equivalent to it, and that no two quasi-monotonic sequences can be Mazurkiewicz equivalent.

One intuition behind quasi-monotonicity is that if all transitions enabled at a global state are independent then we need to explore just one interleaving. We choose this interleaving to be one in which transitions are executed in increasing (monotonic) order of their thread-ids. If, however, some of the transitions enabled at a global state are dependent than we need to explore interleavings that may violate this natural monotonic order. In that case, we allow an out-of-order-execution, viz., a transition tr with larger thread-id to execute before tr' only if there is a dependency chain, i.e., a sequence of transitions from tr to tr'. Such sequences are called quasi-monotonic.

Note that although our monotonic POR method has the same goal as the classic POR methods, it does not directly correspond to any existing method. In particular, it is not a symbolic implementation of any of these explicit-state methods. It should be understood that the MPOR methods described herein may be applied to concurrent program analyses like model checking, dataflow analysis, testing, or any other analysis technique.

The present methods can guarantee optimality in reduction for a program with an arbitrary number of threads; that is, all redundant interleavings are removed. To our knowledge, there has not been any such guarantee among existing POR methods. Further, a present encoding scheme is well suited for symbolic search using Boolean satisfiability problem (SAT)/Satisfiability Modulo Theory problem (SMT) solvers or SAT/SMT solvers.

The "quasi monotonic sequences" methodology accurately captures dynamic independent transitions in a concise way. The monotonic partial order reduction (MPOR) method encodes the quasi-monotonic sequences as a set of constraints of optimal partial order reduction. For systems with an arbitrary number of threads, the MPOR guarantees the removal of any redundant interleavings—there is no such guarantee by any existing method in the prior art. MPOR is well suited for symbolic implementation using SMT/SAT solvers—traditional POR methods (based on persistent sets) are not well suited for symbolic implementation.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Partial-order reductions exploit the fact that concurrent computations are partial orders on essentially operations of threads on communication objects. Thus, instead of exploring all interleavings that realize this partial order, it suffices to explore just a few (ideally just one). Interleavings which are equivalent, i.e., realize the same partial order, are characterized using the notion of an independence relation between transitions.

Independence relation: $R \subseteq trans \times trans$ is an independence relation iff for each $\langle t_1, t_2 \rangle \in R$ the following two properties hold for all $s \in S$: 1) if $t_1$ is enabled in s and $$s \xrightarrow{t_1} s^1,$$

then $t_2$ is enabled in s iff $t_2$ is enabled in s'; and 2) if $t_1$, $t_2$ are enabled in s, there is a unique state s' such that $$s \xrightarrow{t_1 t_2} s^1 \text{ and } s \xrightarrow{t_2 t_1} s^1.$$

In other words, independent transitions can neither disable nor enable each other, and enabled independent transitions commute. This definition of independence relation has been mainly of semantic use, since it is not practical to check the above two properties for all states to determine which transitions are independent. Instead, traditional collision detection (i.e., identification of dependent transitions) often uses conservative but easy-to-check sufficient conditions. These typically over-approximate the collisions leading to exploration of more interleavings than are necessary.

Consider, for example, the transitions $t_1:\alpha[i]=e_1$ and $t_2:\alpha[j]=2$. When $i \neq j$, $t_1$ and $t_2$ are independent However since it cannot be determined statically whether $\alpha[i]$ and $\alpha[j]$ refer to the same array element, $t_1$ and $t_2$ are considered (statically) dependent irrespective of the values of i and j. This results in coarser persistent sets, leading to the exploration of more interleavings than are necessary. Such techniques are therefore not guaranteed to be optimal.

In a conditional dependence relation, two transitions are defined as independent with respect to a state $s \in S$ (as opposed to for all $s \in S$). This extension is geared towards explicit-state model checking, in which persistent sets are computed for individual states. A persistent set at state s is a subset of the enabled transitions that need to be traversed in adaptive search. A transition is added to the persistent set if it has any conflict with a future operation of another thread. The main difficulty in persistent set computation lies in detecting future collisions with enough precision. Although it is not practical to compute the conditional dependence relation for each state in S for collision detection purposes, there are explicit-state methods to exploit such dynamically independent transitions. However, these classic definitions of independence are not well suited for symbolic search.

Optimal Symbolic Partial Order Reduction: (Bounded Model Checking (BMC)): We start by reviewing the basics of SMT/SAT based bounded model checking. Given a multi-threaded program and a reachability property, BMC can check the property on all execution paths of the program up to a fixed depth K. For each step $0 \leq k \leq K$, BMC builds a formula $\Psi$ such that $\Psi$ is satisfiable iff there exists a length-k execution that violates the property. The formula is denoted $\Psi = \Phi \wedge \Phi_{prop}$ where $\Phi$ represents all possible executions of the program up to k steps and $\Phi_{prop}$ is the constraint indicating violation of the property.

In the following, we focus on the formulation of $\Phi$. Let $V = V_{global} \cup V_i$ where $V_{global}$ are global variables and $V_i$ are local variables in $T_i$. For every local (global) program variable, we add a state variable to $V_i(V_{global})$. Array and pointer accesses need special handling. For an array access $\alpha[i]$, we add separate variables for the index i and for the content $\alpha[i]$. Similarly, for a pointer access *p, we assign separate state variables for (*p) and p. We add a $pc_i$ variable for each thread $T_i$ to represent its current program counter. To model non-determinism in the scheduler, we add a variable sel whose domain is the set of thread indices $\{1, 2, \ldots N\}$. A transition in $T_i$ is executed only when sel=i. At every time frame, we add a fresh copy of the set of state variables. Let $u^i \in V^i$ denote the copy of $u \in V$ at the i-th time frame. To represent all possible length-k interleavings, we first encode the transition relations of individual threads and the scheduler, and unfold the composed system exactly k time frames.

$$\Phi := I(V^0) \wedge \bigwedge_{i=0}^{k} \left( SCH(V^i) \wedge \bigwedge_{j=1}^{N} TR_j(V^i, V^{i+1}) \right)$$

where $I(V^0)$ represents the set of initial states, SCH represents the constraint on the scheduler, and $TR_j$ represents the transition relation of thread $T_j$. Without any partial order reduction, $SCH(V^i):=true$, which means that sel takes all possible values at every step. This default SCH considers all possible interleavings. Partial order reduction can be implemented by adding constraints to SCH to remove redundant interleavings.

We now consider the formulation of $TR_j$. Let $VS_j = V_{global} \cup V_j$ denote the set of variables visible to $T_j$. At the i-th time frame, for each $t \in trans_j$ (a transition between control locations $loc_1$ and $loc_2$), we create $tr_t^i$. If t is an assignment u:=e, then $tr_t^i := pc_j^i = loc_1 \wedge pc_j^{i+1} = loc_2 \wedge u^{i+1} = e^i \wedge (VS_j^{i+1} \setminus u^{i+1}) = (VS_j^i \setminus u^i)$.

If t is a branching statement assume(c), as in if (c), then $tr_t^i := pc_j^i = loc_1 \wedge pc_j^{i+1} = loc_2 \wedge c^i \wedge VS_j^{i+1} = VS_j^i$.

Overall, $TR_j^i$ is defined as follows: $TR_j^i := (sel^i = j \wedge tr_t^i) \vee (sel^i \neq j \wedge V_j^{i+1} = V_j^i)$. The second term says that if $T_j$ is not selected, variables in $V_j$ do not change values.

Figure 2:
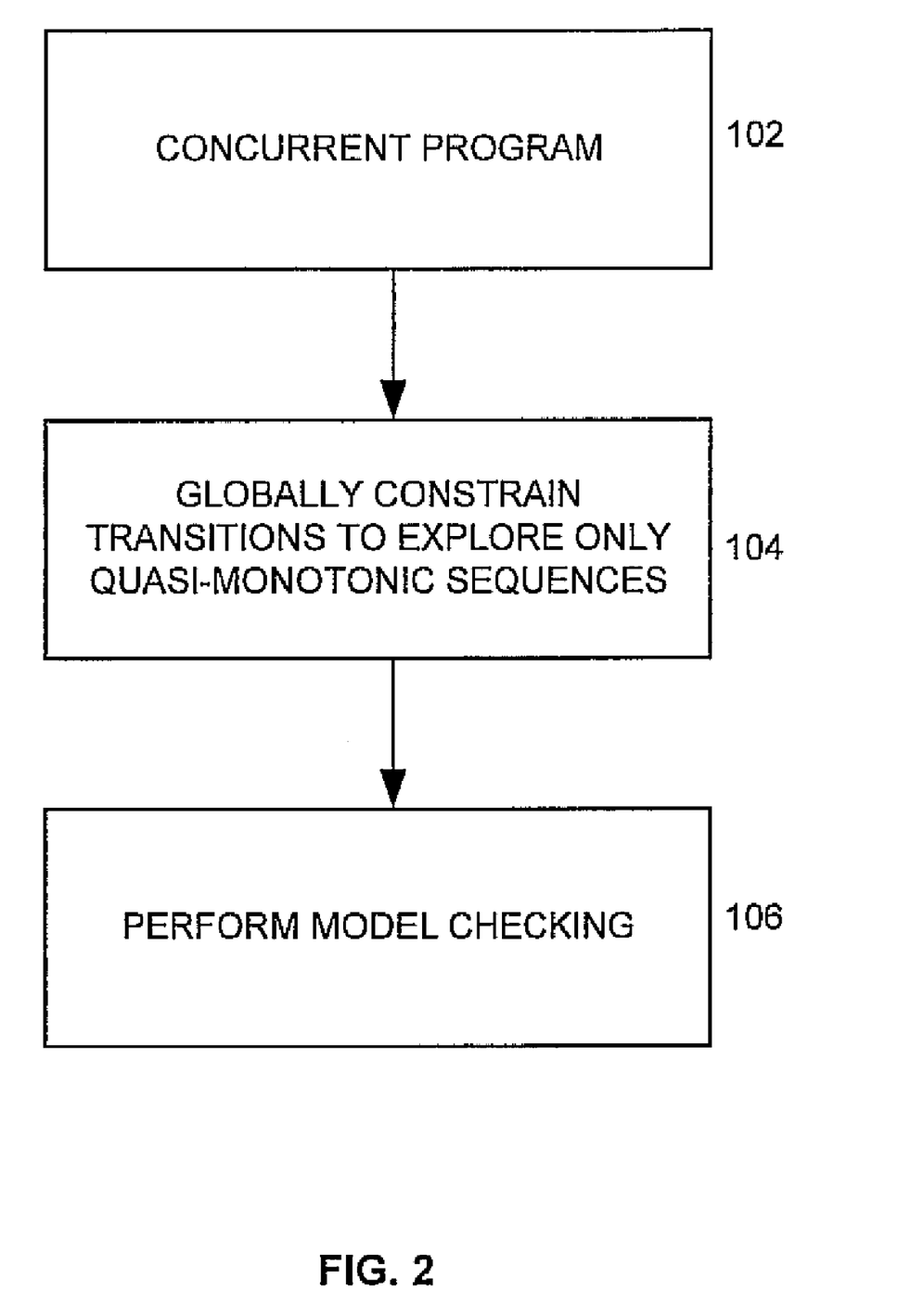
FIG. 2 is a block/flow diagram showing monotonic partial order reduction in accordance with one embodiment.

Referring now to the drawings in which like numerals represent the same or similar elements and initially to FIG. 2, a system/method for optimal symbolic or monotonic partial order reduction (MPOR) is illustratively shown in accordance with one embodiment. In block 102, a concurrent program is provided that will be analyzed in accordance with the present principles. A concurrent program has two or more threads that can be executed simultaneously. Concurrent programs may be employed in software devices such as drivers or system programs or may be any computer program or routine that included two or more threads running together. In block 104, transitions in the threads are globally constrained as opposed to locally constrained with other POR methods. The global constraining is performed so that only quasi-monotonic sequences of the program can be explored. This results in an optimal solution especially when there are greater than two threads. In block 106, bounded model checking is performed symbolically. This is in contrast to many methods that perform model checking explicitly.

We now show that using a small amount of additional memory, we can achieve optimality. For motivating our technique, we consider a simple concurrent program P comprised of three threads $T_1$, $T_2$ and $T_3$ shown in FIG. 3. Suppose that, to start with, P is in the global state $(c_1, c_2, c_3)$ with thread $T_i$ at location $c_i$ (for simplicity, we have shown only the control locations and not the values of the variables in the global state).

Figure 3:
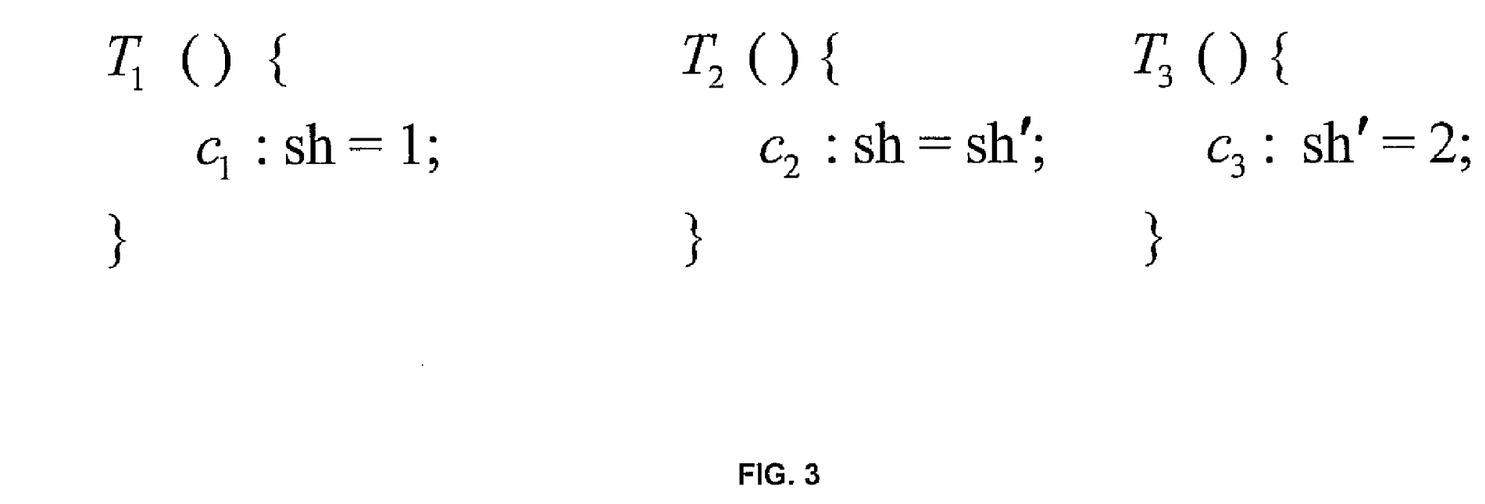
FIG. 3 is an example program showing three threads for demonstrating the present principles.

One goal is to add constraints on-the-fly during bounded model checking which restrict the set of interleavings explored in a way such that all necessary interleavings are explored and no two interleavings explored are Mazurkiewicz equivalent. Let $t_i$ denote the program statement at location $c_i$ of thread $T_i$, respectively. In the global state $s = (c_1, c_2, c_3)$, we see that transitions $t_1$ and $t_2$ are dependent as are $t_2$ and $t_3$ However, $t_1$ and $t_3$ are independent of each other. Since $t_1$ and $t_2$ are dependent on each other, we need to explore interleavings wherein $t_1$ is executed before $t_2$, and vice versa.

For convenience, given transitions t and t' fired along a computation x of the given program, we write $t_1 < t_2$ to denote that $t_i$ is executed before $t_j$ along x. Note that the same thread statement (say, within a program loop) may be fired multiple times along a computation. Each firing instance is considered a different transition. Then, using the new notation, we can rephrase the scheduling constraints imposed by dependent transitions as follows: since $t_1$ and $t_2$ are dependent transitions, we need to explore interleavings along which $t_1 < t_2$ and those along which $t_2 < t_1$. Similarly, we need to explore interleavings along which $t_2 < t_3$, and vice versa. However, since $t_1$ and $t_3$ are independent we need to avoid exploring both relative orderings of these transitions wherever possible.

In general, one could expect that for independent transitions tr and tr' such that tid(tr)<tid(tr'), it suffices to explore only interleavings satisfying tr<tr', i.e., force independent transitions to execute in increasing order of their thread-ids.

However, the transitivity of '<', might result in ordering constraints on $t_1$ and $t_3$ even though the two transitions are independent. The ordering constraints $t_3<t_2$ and $t_2<t_1$ imply that $t_3<t_1$, i.e., $t_3$ must be fired before $t_1$ even when the two transitions are independent. Looking from another perspective, $t_3$ needs to be executed before $t_1$ because there is a sequence of transitions from $t_3$ to $t_1$ (in our case $t_3$, $t_2$, $t_1$) wherein adjacent transitions are pairwise dependent. Thus, given a pair of independent transitions tr and tr' such that tid(tr)<tid(tr'), a modification to the previous strategy would be to not explore any interleavings wherein tr'<tr provided there is no sequence of transitions from tr' to tr wherein adjacent transitions are pair-wise dependent, i.e., force independent transitions to execute in increasing order of their thread-ids as long as there are no dependency constraints arising from the transitivity of '<' that force an out-of-order execution.

This strategy, however, might lead to many necessary interleavings being unexplored. Consider a new example program with a global state ($c_1$, $c_2$, $c_3$, $c_4$), where the transitions $t_i$ of $T_i$ enabled at $c_i$, respectively, are such that $t_1$ are $t_4$ dependent only with each other, as are $t_2$ and $t_3$. Consider the set of interleavings satisfying $t_4<t_1$ and $t_3<t_2$. Using the facts that (i) tid($t_1$)<tid, and (ii) there cannot be a sequence of transitions leading from $t_3$ to $t_1$ wherein adjacent transitions are pairwise dependent. By this strategy, we would execute $t_1$ before $t_3$ leading to the interleaving $t_4,t_3,t_2$. However, since $t_2$ and $t_4$ are independent, and there is no sequence of transitions from $t_4$ to $t_2$ wherein adjacent transitions are pairwise dependent, $t_2$ must be fired before $t_4$. This rules out the above interleaving. Using the above reasoning, one can show that the above strategy will in fact rule out all interleavings where $t_4<t_1$, and $t_3<t_2$. Essentially, this happens because thread-ids of processes in groups of dependent transitions have opposing orders. In our case, the groups $t_1$, $t_4$ and $t_2$, $t_3$ of mutually dependent transitions are such that tid($t_1$)<tid($t_2$) but tid($t_4$)>tid($t_3$).

One strategy to handle the above problem, is to start scheduling the transitions in increasing order of their thread-ids while taking into account the scheduling constraints imposed by the dependencies. Thus, in the above example, suppose that we want to explore interleavings satisfying $t_4<t_1$ and $t_3<t_2$. Then, we start by first trying to schedule $t_1$. However, since $t_4<t_1$, we have to schedule $t_4$ before $t_1$. Moreover, since there are no scheduling restrictions (even via transitivity) on $t_2$ and $t_3$ vis-a-vis $t_1$ and $t_4$, and since tid($t_2$)>tid($t_1$) and tid($t_3$)>tid($t_1$), we schedule both $t_2$ and $t_3$ to execute after $t_1$. Thus, we constrain all interleavings satisfying $t_4<t_1$ and $t_3<t_2$ to start with the sequence $t_4$, $t_1$. Next, we try to schedule the transition with the lowest thread-id that has not yet been scheduled, i.e., $t_2$. However, since $t_3<t_2$, we must schedule $t_3$ first and then $t_2$ resulting in the interleaving $t_4t_1t_3t_2$.

More generally, for independent transitions t and t', where tid(t)<tid(t'), we allow t' to be fired before t only if there is a sequence of transitions to, $t_0$, $t_1$, . . . , $t_k$, wherein $t_0$=t', each pair of adjacent transitions is dependent, and either $t_k$=t or tid($t_k$)<tid(t). This leads to the concept of a dependency chain.

Dependency Chain: Let t and t' be transitions fired along a computation x be such that t<$_x$t'. A dependency chain along x starting at t is a (sub-)sequence of transitions $tr_{i_0}$, . . . , $tr_{i_k}$ fired along x, where $i_0<i_1<$ . . . $<i_k$ and for each j∈[0 . . . k−1], $tr_j$ is dependent with $tr_{j+1}$, and there does not exist a transition fired along x between $tr_{i_j}$ and $tr_{i_{j+1}}$ that that is dependent with $tr_{i_j}$.

We use $\Rightarrow_x$t' to denote that there is a dependency chain from t to t' along x. Then, our strategy can be re-phrased as follows: for independent transitions C and t', where tid(t)<tid(t'), we allow t' to be fired before t only if (i) t $\Rightarrow_x$t', or (ii) there exists transition t'', where tid(t'')<tid(tr), tr' $\Rightarrow_x$tr'', tr''<$_x$tr. The intuition behind this strategy is that since there is such a chain from t' to t'' the dependency constraints require that t' be executed before t''. This leads to the notion of quasi-monotonic sequence.

Quasi-Monotonic Computation: A computation x is said to be quasi-monotonic iff for each pair of transitions tr and tr' such that tr'<$_x$tr, we have tid(tr')>tid(tr) only if either (i) tr' $\Rightarrow_x$tr, or (ii) there exists a transition tr'' such that tid(tr'')<tid(tr), tr' $\Rightarrow_x$tr'', tr''<$_x$tr. For the present strategy, Restrict the set of explored interleavings to all the quasi-monotonic computations We need to show the following: 1) Soundness, i.e., all necessary interleavings are explored. In other words, each Mazurkiewicz equivalence class has a quasi-monotonic computation. 2) Optimality, i.e., no two interleavings explored are Mazurkiewicz equivalent. In other words, each Mazurkiewicz equivalence class has a unique quasi-monotonic computation. We start with soundness.

Soundness: For each interleaving x, there exists a quasi-monotonic interleaving that is Mazurkiewicz equivalent to x.

Optimality: For two threads, the optimal symbolic reduction removes all redundant interleavings.

Figure 4:
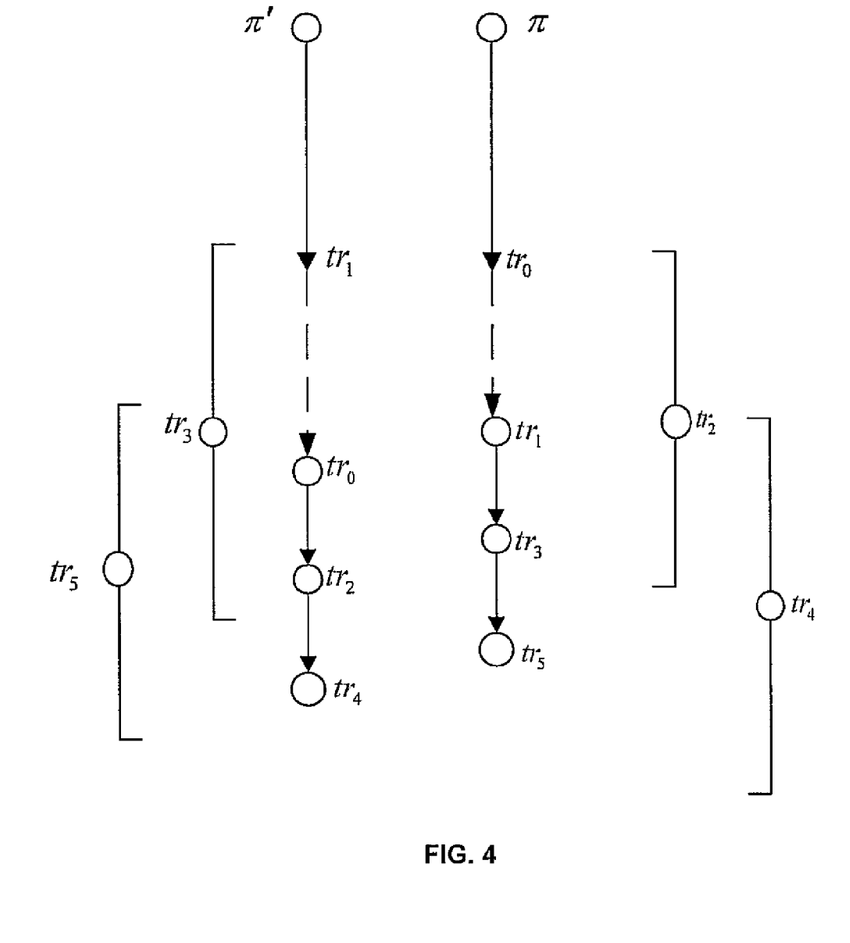
FIG. 4 is a diagram illustratively showing dependency chains for demonstrating the present principles.
Figure 5:
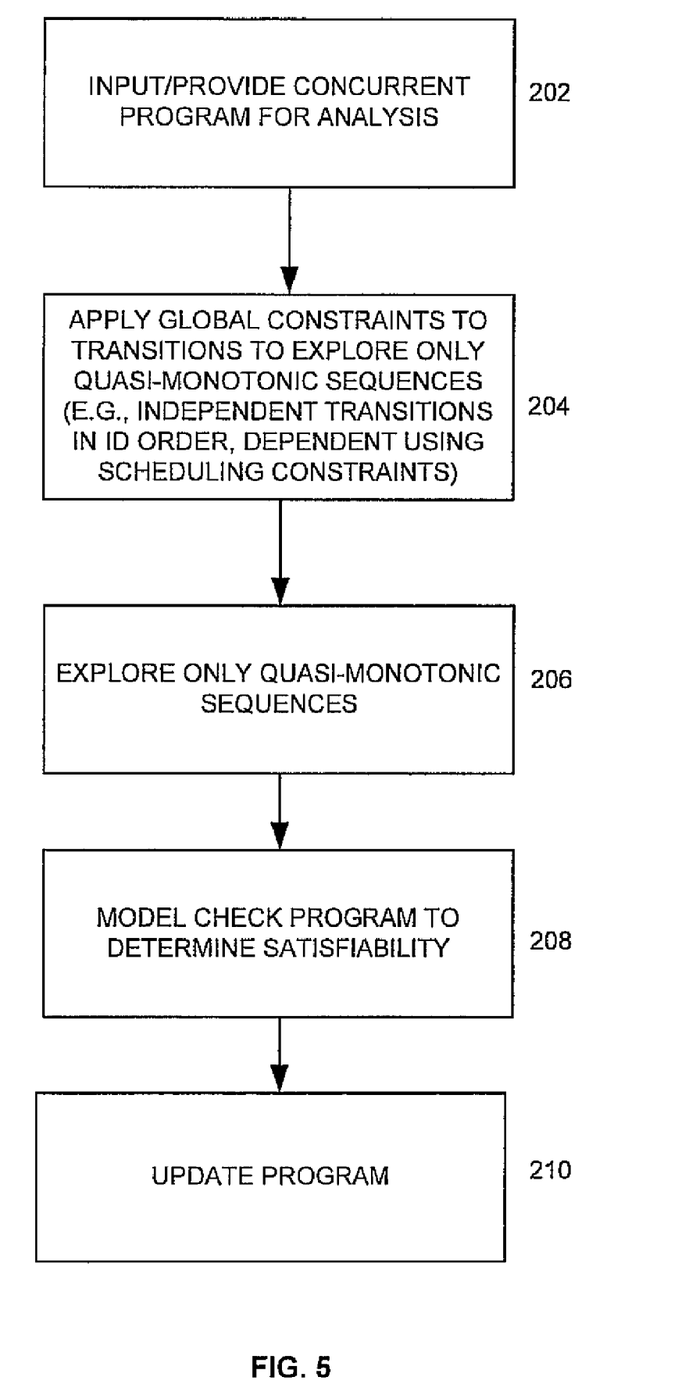
FIG. 5 is a block/flow diagram showing monotonic partial order reduction for analyzing a concurrent program in accordance with one embodiment.

Referring to FIG. 4, shows dependency chains for proving optimality by contradiction Assume π,π' are two quasi-monotonic sequences which are (Mazurkiewicz) equivalent. By definition, π and π' have the same set of transitions; π' is a permutation of π. Let $tr_1=\pi'_j$ in π' be the first transition that is swapped to be $\pi_j$ in π (where i<j) and let $tr_0=\pi_i$. Then π and π' share a common prefix up to i. For definiteness, we assume that tid($tr_1$)<tid($tr_0$), the other case where tid($tr_1$)>tid($tr_0$) being handled similarly.

Since π and π' are Mazurkiewicz equivalent and the relative order of firing of $tr_0$ and $tr_1$ is different in the two paths, $tr_0$ and $tr_1$ must be independent. Since tid($tr_1$)<tid($tr_0$) and if is quasi-monotonic, there must exist a transition $tr_2$, such that $tr_0<_\pi tr_2<_\pi tr_1$, tid($tr_2$)<tid($tr_1$) and $tr_0 \Rightarrow tr_2$ but $tr_2 \not\Rightarrow tr_1$ (note that since $tr_0$ and $tr_1$ are independent, there cannot exist a dependency chain from $tr_0$ to $tr_1$). In FIG. 4, the circle on the square bracket corresponding to $tr_2$ along π indicates that $tr_2$ lies between $tr_0$ and $tr_1$ along π.

Since all adjacent transitions in a dependency chain are, by definition, dependent, the relative ordering of the firing of transitions along any dependency chain must be the same in both π and π' as they are Mazurkiewicz equivalent. It follows then that $tr_0<_{\pi'} tr_2$. Since $tr_1<_{\pi'} tr_0$, we have $tr_1<_{\pi'} tr_2$. Now, since π' is quasi-monotonic and tid($tr_2$)<tid($tr_1$), there must exist a transition $tr_3$, such that $tr_1<_{\pi'} tr_3<_{\pi'} tr_2$, tid($tr_3$)<tid($tr_2$) and $tr_1 \Rightarrow_{\pi'} tr_3$ but $tr_3 \not\Rightarrow_{\pi'} tr_2$. Again, as before since $tr_1 \Rightarrow_{\pi'} tr_3$, we have $tr_1 \Rightarrow_\pi tr_3$. Thus $tr_1<_\pi tr_3$. Since $tr_2<_\pi tr_1$, we have $tr_2<_\pi tr_3$, but tid($tr_3$)<tid($tr_2$), and we can repeat the above argument. Thus continuing the above process, we can obtain a sequence $tr_0$, $tr_1$, . . . , $tr_k$ of transitions such that tid($tr_k$)<tid($tr_{k-1}$)< . . . <tid($tr_1$)<tid($tr_0$) and 1. for each i∈[0 . . . k−2], $tr_i \Rightarrow tr_{i+2}$
2. for each i∈=[0 . . . k/2], $tr_{2i}<_\pi tr_{2i-1}$
3. for each i∈[0 . . . k/2], $tr_{2i+1}<_{\pi'} tr_{2i}$.

Since the thread-ids of the transitions $tr_i$ form a strictly descending sequence, there exists a sequence of transitions of maximum length satisfying the above properties. Assume now that the above sequence is, in fact, maximal. We consider two cases. First assume that k is even. Then there is dependency chain (property 1) from $tr_{k-2}$ to $tr_k$ along π'. Thus $tr_k$ is fired after $tr_{k-2}$ along π. Also, $tr_{k-1} <_\pi t_{k-2} <_\pi tr_k$ (property 3). Note also that $tid(tr_k) < tid(t_{k-2})$. Thus, by quasi-monotonicity of π' either (i) there exists a dependency chain from $tr_{k-1}$ to $tr_k$, or (ii) there exists a transition $tr_{k-1}$ such that $tr_{k-1} \Rightarrow tr_{k+1} \Rightarrow tr_k$ and $tr_{k-1} <_\pi tr_{k+1} <_\pi tr_k$. The second case cannot happen as it would violate the maximality of the sequence $\{tr_1\}$. Thus $tr_{k-1} \Rightarrow tr_k$ which implies that $tr_{k-1} <_x tr_k$ (as dependency chains are preserved across Mazurkiewicz equivalent sequences). However, by property 2, $tr_k <_x tr_{k-1}$ which is absurd. This contradicts our initial assumption that there exist two Mazurkiewicz equivalent quasi-monotonic sequences. This completes the proof. The other case where k is odd can be handled similarly.

Implementation: To implement our technique, we need to track dependency chains in a space efficient manner. Towards that end, the following result is crucial.

Let transitions tr and tr' fired by processes $T_i$ and $T_j$, respectively, along x, constitute a violation of quasi-monotonicity. Suppose that $tr' <_x tr$ and $tid(tr') > tid(tr)$. Then any transition tr'' by $T_j$ such that $tr' <_x tr'' <_x tr$ also constitutes a violation of quasi-monotonicity with respect to tr. Due to the above result, we have the important observation that to ensure quasi-monotonicity, we need to track dependency chains only from the last transition fired by each process and net from every transition.

Tracking Dependency Chains: To track dependency chains, for each pair of threads $T_i$ and $T_j$, we introduce a new variable $DC_{ij}$. $DC_{ji}(k)$ denotes whether there is a dependency chain from the last transition executed by $T_i$ to the transition executed by $T_j$ before or at time step k.

$DC_{ji}(k)$ is either −1 (no) or 1 (yes) if at least one transition from $T_j$ has been executed. Otherwise, $DC_{ji}(k)=0$.

Updating $DC_{ij}$: If at time step k thread $T_i$ is executing transition tr, then for each thread $T_1$, we check whether the last transition executed by $T_l$, is dependent with tr. $DEP_{li}(k)$ denotes whether there is a dependency relation between the transition being executed by thread $T_i$ at time step k to the transition executed by $T_l$. Note that $DEP_{ii}(k)=1$ always holds (due to control conflict).

If $DEP_{li}(k+1)=1$ and if $D_{jl}(k) \neq 0$, i.e., there is a dependency chain from the last execution of $T_j$ to the last execution of $T_l$, then this dependency chain can be extended from the lost transition executed by $T_l$ to the last transition executed by $T_i$, i.e, tr. In that case, we set $D_{ji}(k+1)=1$. Also the dependency chain corresponding to $T_i$ needs to start afresh and so we set
$D_{ij}(k+1)=−1$ for all $j \neq i$.
$DC_{ii}(k+1)=1$ when $j=i$
$DC_{ii}(k+1)=−1$ when $j \neq i$
$DC_{ji}(k+1)=0$ when $j \neq i$ and $DC_{jj}(k)=0$
$DC_{ji}(k+1)=V_{l=1}{}^n(DC_{jl}(k)=1 \wedge DEP_{li}(k+1))$ when $j \neq i$ and $DC_{jj}(k-1) \neq 0$
$DC_{pq}(k+1)=DC_{pq}(k)$ when $p \neq i$ and $q \neq i$
(The total number of $DC_{ij}(k)$ is $n^2$.)

Encoding: The decoupling of the dependency constraints from the encoding of quasi-monotonicity has the advantage that it affords us the flexibility to incorporate various notions of dependencies arising from different sources based on the applications. These include dependencies from synchronization primitives, memory consistency models like sequential consistency. For the present implementation, we have illustratively used only dependencies arising out of shared variable accesses the encoding of which is given below.

We define the following set of variables for each thread F:
$pWV_i(k)$, $pRV_i(k)$, $pR^2V_i(k)$ denote the Write-Variable and Read-Variables of the last transition executed by $T_i$ before step k (assume that each assignment has at most three operands).

$wv_i(k)$, $wr_i(k)$, $r^2v_i(k)$ denote the Write-Variable and Read-Variables of the transition executed by $T_i$ at step k.

We encode $DEP_{ij}(k)$ as follows:
$DEP_{ij}(k)=(pWV_i(k)=wv_i(k) \wedge pWV_i((k) \neq 0 \vee )$
$pWV_i(k)=rv_i(k) \wedge pWV_i(k) \neq 0 \vee$
$pWV_i(k)=r^2v_i(k) \wedge pWV_i(k) \neq 0 \vee$
$pRV_i(k)=wv_i(k) \wedge wv_i(k) \neq 0 \vee$
$pR^2V_i(k)=wv_i(k) \wedge wv_i(k) \neq 0)$.

(The total number of $DEP_{ij}(k)$ is $n^2$, each has a constant number of equality constraints.)

Read and Write Variables: Let $t_1, \ldots, t_n \in trans_i$ be the set of transitions of $T_i$, and $t_1.writeVar$ be the Write-Variable of the transition $t_1$.

We encode $wv_i(k)$ as follows
$wv_i(k)=(sel^k=i \hat{} en_{t_1}(V^k))?t_1 \cdot writeVar:$
$(sel^k=i \hat{} en_{t_2}(V^k))?t_2 \cdot writeVar:$
...
$(sel^k=i \hat{} en_{t_n}(V^k)) ?t_n \cdot writeVar:0$ We encode $pWV_i(k+1)$ as follows
$pWV_i(k+1)=(sel^k=i \hat{} en_{t_1}(V^k))?t_1 \cdot writeVar:$
$(sel^k=i \hat{} en_{t_2}(V^k))?t_2 \cdot writeVar:$
...
$(sel^k=i \hat{} en_{t_n}(V^k))?t_n \cdot writeVar:pWV_i(k)$ At time step 0, we assume that $pWV_i(0)=0$.

Scheduling Constraints: $S_i(k)$ denotes whether thread $T_i$ can be scheduled to execute at time step k to ensure quasi-monotonicity. $S_i(k)$ is either 0 (no) or 1 (yes). The scheduling constraint at time step k is that if we schedule $T_i$, then $S_i(k)$ is 1. That is, we conjoin the following constraint to SCH:

$$\bigwedge_{i=1}^{u} (sel^k = i \Rightarrow S_i(k)).$$

Schedule Constraints Encoding: We encode $S_i(k)$ (where $1 \leq i \leq n$) as follows:
$S_i(0)=true$;
for $k>0$, $$S_i(k) = \bigwedge_{j>i} \left( DC_{jl}(k) \neq -1 \vee \bigvee_{l<i} DC_{jl}(k-1) = 1 \right)$$

Note that $DC_{ji}(k) \neq -1$ means $DC_{ji}(k)=0 \vee DC_{ji}(k)=1$.

Memory Overhead: Note that the information regarding the last transition executed by each process is as formulated above, i.e., information about variables, arrays, array indices, pointers etc. accessed which needs a constant number of words for each process. For this the memory overhead is $O(n)$. Each $D_{ij}$ can take only three possible values and so $D_{ij}$ needs at most 3 bits. Thus, the memory overhead here is $O(n^2)$. Finally storing $S_i$ needs just one bit for each thread for which the overhead in $O(n)$. Thus, the total overhead is $O(n^2)$, where n is the number of processes. Note that due to state space explosion the number of threads that can be considered is typically few (less than 5). Thus, this makes the overhead negligible for all practical purposes.

Experiments: We have implemented the optimal POR methods in an SMT-based bounded model checker using the Yices SMT solver Yices is capable of deciding satisfiability formulae with a combination of theories including propositional logic, integer linear arithmetic, and arrays. We performed experiments with two variants of the optimal POR reduction and a baseline BMC algorithm with no POR. The two variants represent different tradeoffs between the encoding overhead and the amount of achievable reduction. The first one is 2-peephole POR, in which the quasi-monotonicity constraints are collected only within a window of two consecutive time frames (hence the reduction is not optimal). The second one is optimal POR, in which the entire set of quasi-monotonicity constraints are added to ensure quasi-monotonicity (the reduction is optimal). Our experiments were conducted on a workstation with 2.8 GHz Xeon processor and 4 GB memory running Red Hat Linux 7.2.

We use a parameterized version of dining philosophers as our test example. The dining philosopher model we used can guarantee the absence of deadlocks. Each philosopher (thread) has its own local state variables, and threads communicate through a shared array of chop-sticks. When accessing the global array, threads may have conflicts (data dependency). The first property (pa) we checked is whether all philosophers can eat simultaneously (the answer is no). The second property (pb) is whether it is possible to reach a state in which all philosophers have eaten at least once (the answer is yes).

We set the number of philosophers (threads) to 2, 3 . . . , and compared the runtime performance of the three methods. When comparing the sizes of the SMT formulae, we found that those produced by the optimal POR encoding typically are twice as large as the plain BMC instances, and those produced by the 2-peephole POR encoding are slightly larger than the plain BMC instances.

The reduction achieved by optimal POR (MPOR) more than outweighs its encoding overhead. For programs with two threads, 2-peephole POR outperformed optimal POR (MPOR). This is because 2-peephole POR is also optimal for two threads, and it has a significantly smaller encoding overhead. However, as the number of threads increases, percentage-wise, more and more redundant interleavings elude the 2-peephole POR constraints. For more than four threads, the overhead of 2-peephole POR constraints outweighs the benefit (runtime becomes longer than plain BMC), and MPOR is far superior.

The monotonic partial order reduction (MPOR) method for model checking concurrent systems, is based on a new notion of quasi-monotonic sequences. A concise symbolic encoding of quasi-monotonic sequences is well suited for using SMT/SAT solvers to find property violations. We have shown that the new monotonic POR method can achieve significantly more reduction compared to other existing methods. The new method is optimal, i.e., guarantees the removal of all redundant interleavings.

Referring to FIG. 4, a system/method for analyzing a program is illustratively depicted. In block 202, a concurrent program having at least two threads with at least one interleaving therebetween is provided or input for analysis. In block 204, globally constrains are applied to transitions in the threads. This includes constraining a set of interleavings to be explored such that no two explored interleavings are equivalent (e.g., Markurkiewicz equivalent) or redundant. Independent transitions are forced to execute in increasing order of their thread identifiers, and dependent transitions are accounted for by employing scheduling constraints to reorder the transitions. The globally constraining includes dynamically adding constraints to ensure quasi-monotonicity for the model checking. The globally constrains include constraining transitions depending on their thread identifier.

In block 206, only quasi-monotonic sequences are explored in the threads. In block 206, the program is model checked to determine satisfiability of states within the threads. In block 210, the program is updated in accordance with a determination of nonsatisfiability. The system/method is applicable to at least one of explicit-state and symbolic searching using a satisfiability solver.

Having described preferred embodiments for monotonic partial order reduction (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for fixing errors in concurrent programs stored on a memory device, comprising:
   inputting a concurrent program with at least two threads; and
   efficiently exploring the state space of the concurrent program by analyzing only those inter-leavings of threads comprising the concurrent program that form quasi-monotonic sequences of thread operations;
   generating witness traces for errors in the concurrent program detected through the state space search;
   modifying the source code of the concurrent program to fix the errors based on the witness traces.

2. The method as recited in claim 1, wherein exploring only quasi-monotonic sequences of thread operations includes forcing independent transitions accessing different shared variables to execute in increasing order of their thread identifiers unless dependencies between transitions resulting from accesses to the same shared variable force an out-of-order-execution in that transitions with higher thread identifiers are executed before transitions with lower thread identifiers.

3. The method as recited in claim 1, wherein a SAT/SMT solver is employed to explore the quasi-monotonic computations of the concurrent program.

4. The method as recited in claim 3, wherein constraints are added dynamically during exploration of the concurrent program via a SAT/SMT solver by using extra variables to track dependency chains in threads that are used to ensure quasi-monotonicity of thread sequences.

5. The method as recited in claim 1, wherein the method is applicable to at least one of explicit-state and symbolic searching using a satisfiability solver.

6. The method as recited in claim 1, wherein globally constraining transitions includes constraining a set of inter-leavings such that no two explored interleavings are equivalent or redundant.

* * * * *